United States Patent
Xiao et al.

(10) Patent No.: US 7,668,346 B2
(45) Date of Patent: Feb. 23, 2010

(54) JOINT BOOSTING FEATURE SELECTION FOR ROBUST FACE RECOGNITION

(75) Inventors: Rong Xiao, Haidian District (CN); Xiaoou Tang, Haidian District (CN)

(73) Assignee: Microsoft Corporation, Redmond, WA (US)

( * ) Notice: Subject to any disclaimer, the term of this patent is extended or adjusted under 35 U.S.C. 154(b) by 704 days.

(21) Appl. No.: 11/277,098

(22) Filed: Mar. 21, 2006

(65) Prior Publication Data

US 2007/0223790 A1 Sep. 27, 2007

(51) Int. Cl.
G06K 9/00 (2006.01)
(52) U.S. Cl. .............. 382/118; 382/115; 382/154; 382/190; 382/195; 382/155
(58) Field of Classification Search ......... 382/115–118, 382/154–159, 190
See application file for complete search history.

(56) References Cited

U.S. PATENT DOCUMENTS

| | | | | |
|---|---|---|---|---|
| 6,002,782 A * | 12/1999 | Dionysian | | 382/118 |
| 6,381,346 B1 * | 4/2002 | Eraslan | | 382/118 |
| 7,024,033 B2 * | 4/2006 | Li et al. | | 382/159 |
| 7,221,809 B2 * | 5/2007 | Geng | | 382/280 |
| 2005/0063566 A1 * | 3/2005 | Beek et al. | | 382/115 |
| 2005/0105794 A1 * | 5/2005 | Fung | | 382/159 |
| 2006/0233426 A1 * | 10/2006 | Mariani | | 382/118 |

OTHER PUBLICATIONS

Paul Viola, Michael J. Jones, "Robust Real-Time Object Detection", Cambridge Research Laboratory, Cambridge, Massachusetts, Feb. 2001, pp. 1-25.*

* cited by examiner

*Primary Examiner*—Bhavesh M Mehta
*Assistant Examiner*—Eric Rush
(74) *Attorney, Agent, or Firm*—Lee & Hayes, PLLC

(57) ABSTRACT

Methods and systems are provided for selecting features that will be used to recognize faces. Three-dimensional models are used to synthesize a database of virtual face images. The virtual face images cover wide appearance variations, different poses, different lighting conditions and expression changes. A joint boosting algorithm is used to identify discriminative features by selecting features from the plurality of virtual images such that the identified discriminative features are independent of the other images included in the database.

17 Claims, 5 Drawing Sheets

- Initialize the weights
  Repeat for $c=1,2,...,C$ and $i=1,2,...,N$
  $$w_{1,i}^c = \begin{cases} 1/n_c & y_i = c \\ 1/(N-n_c) & y_i \neq c \end{cases},$$
- Repeat for $t = 1, 2, ..., T$
  1. Normalize the weights,
     $$w_{t,i}^c \leftarrow w_{t,i}^c / (\sum_{i=1}^{N} w_{t,i}^c),$$
     so that $w_t^c$ is a probability distribution.
  2. For each feature $\phi_j(x)$ $j=1,2,...,M$
     For each class $c = 1, 2, ..., C$
        Train the weak classifier $f_j^c(x \mid w_t^c)$ using Equation 6 and evaluate the cost $G_t^c(j)$ using Equation 7
  3. Find the best feature $j_t$ using Equation 8
  4. For each class $c = 1, 2, ..., C$, and each sample $i=1,2,...,N$, update the weight
     $$w_{t+1,i}^c = w_{t,i}^c \exp(-\lambda_i^c f_{j_t}^c(x_i \mid w_t^c))$$
     where $\lambda_i^c = 1$, if $y_i = c$, otherwise $\lambda_i^c = -1$.
- The final strong classifiers are
  $$F^c(x) = sign(\sum_{t=1}^{T} f_{j_t}^c(x \mid w_t^c)).$$
  And selected feature set is $\{j_t\}$, $t=1,2,...,T$

Figure 6

JOINT BOOSTING FEATURE SELECTION FOR ROBUST FACE RECOGNITION

BACKGROUND

Face recognition computer algorithms are used to identify or verify individuals. Each person has characteristics that are useful during the recognition process. A fundamental challenge in face recognition lies in identifying the facial features that are important for the identification of faces. For example, if three faces have a feature that is very similar, such as nose length, it is difficult to use that feature to distinguish the faces. In contrast, if the same three faces have different eye colors, eye color is a feature that can be used to reliably distinguish the faces.

Typically recognition modules are trained by analyzing a few samples of each face. Samples of the same face may have appearance variations due to variations resulting from varying lighting/illumination conditions, different head poses and different facial expressions. A small number of samples per face cannot capture the wide range of variations that are likely to exist when face recognition algorithms are utilized.

A typical approach to capture discriminative facial features is Bayesian face recognition. In this algorithm, differences images are calculated between training images. With this kind of transformation, a face recognition problem is converted to a binary classification problem by predicting whether the differences images are from the same individual. However, this algorithm is not capable of large scale training. Moreover, this kind of transformation is not invertible, therefore facial information is lost to some extent.

SUMMARY

Methods and systems are provided for selecting features that will be used to recognize faces. Three-dimensional models are used to synthesize a database of realistic face images which cover wide appearance variations, different poses, different lighting conditions and expression changes. A joint boosting algorithm is used to identify discriminative features by selecting features from the plurality of virtual images such that the identified discriminative features can be generalized to other database.

These and other advantages will become apparent from the following detailed description when taken in conjunction with the drawings. A more complete understanding of the present invention and the advantages thereof may be acquired by referring to the following description in consideration of the accompanying drawings, in which like reference numbers indicate like features. The invention is being described in terms of exemplary embodiments. Numerous other embodiments, modifications and variations within the scope and spirit of the appended claims will occur to persons of ordinary skill in the art from a review of this disclosure.

BRIEF DESCRIPTION OF THE DRAWINGS

FIG. 6 shows a proposed joint boosting algorithm, in accordance with an embodiment of the invention.

DETAILED DESCRIPTION

Exemplary Operating Environment

Figure 1:
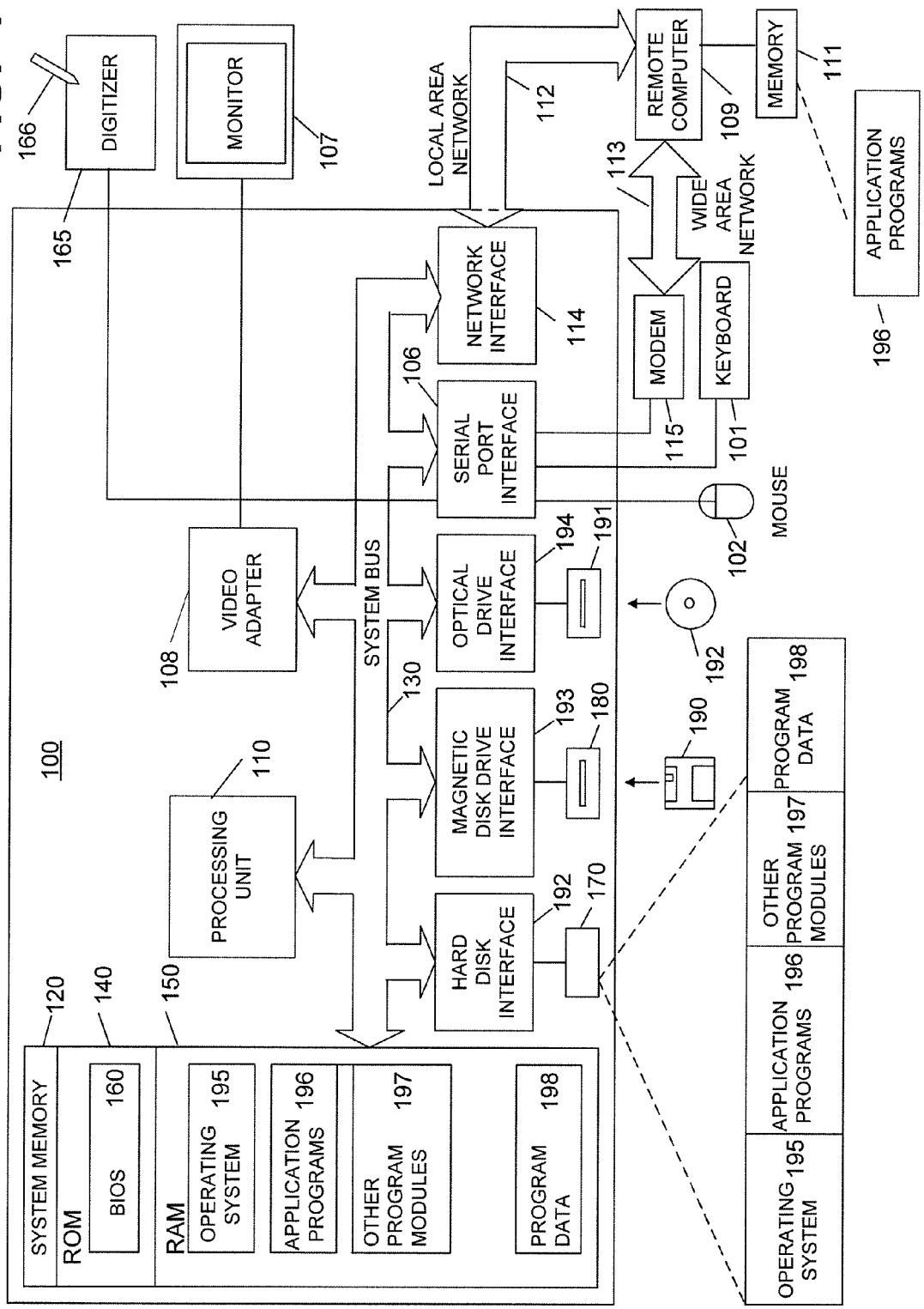
FIG. 1 illustrates an exemplary computer system in which embodiments of the invention may be implemented.

FIG. 1 is a functional block diagram of an example of a conventional general-purpose digital computing environment that can be used in connection with various input devices. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). The illustrated computer 100 includes an optional PCMCIA interface 103 that may connect at least one embodiment of an input device according to the present invention to the computer 100. Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

In one embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

Description of Illustrative Embodiments

Figure 2:
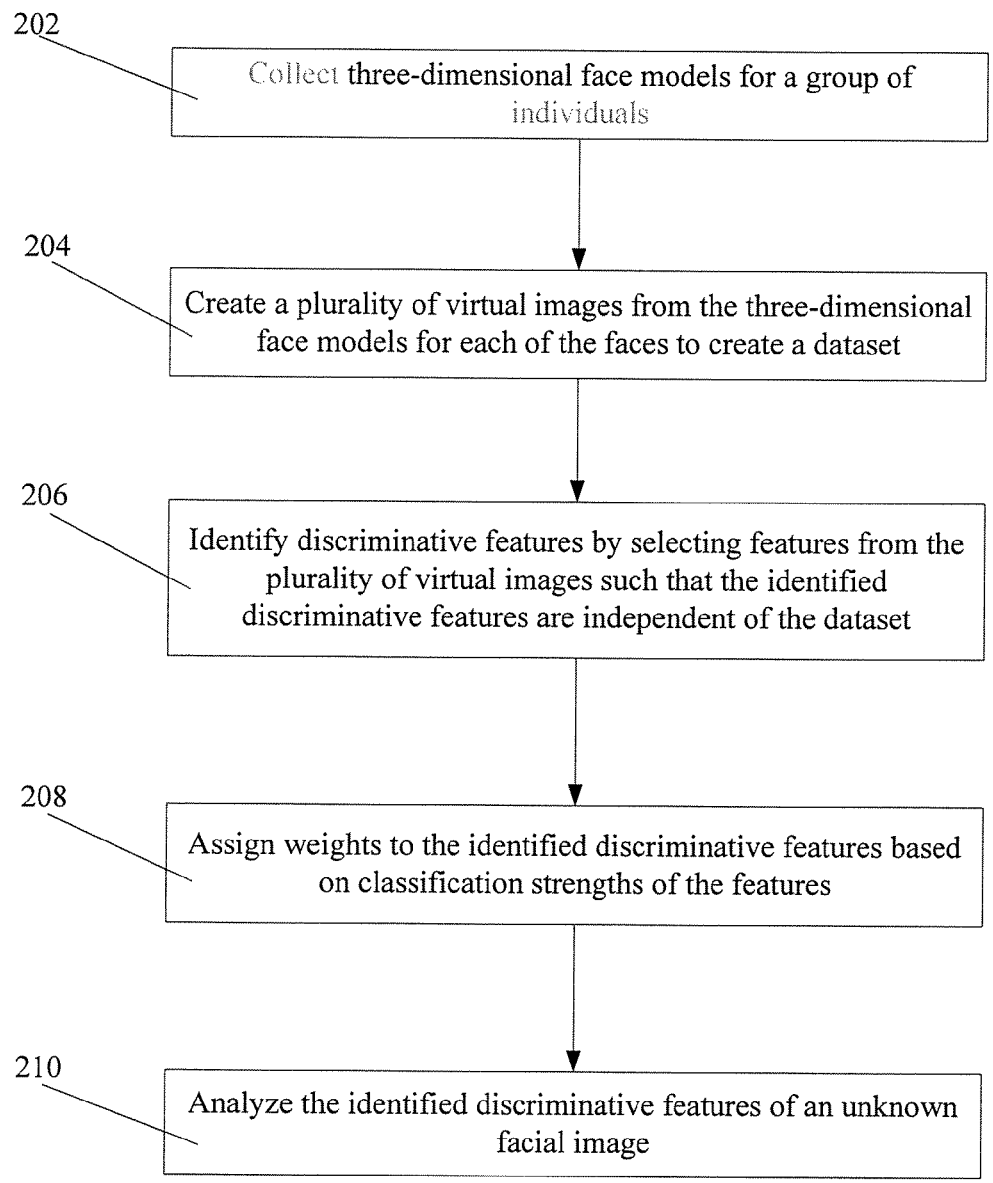
FIG. 2 illustrates a method of selecting facial features used to recognize faces with a face recognition module, in accordance with an embodiment of the invention.
Figure 3:
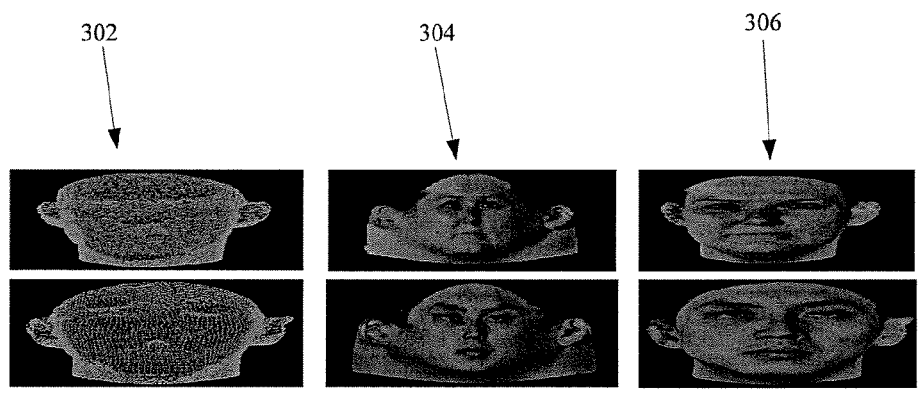
FIG. 3 shows three-dimensional face models collected from a three-dimensional laser-scanner.

FIG. 2 illustrates a method of selecting facial features used to recognize faces with a face recognition module, in accordance with an embodiment of the invention. First, in step 202 three-dimensional face models are collected for a group of individuals. The three-dimensional face models may be created with a three-dimensional laser-scanner. In one embodiment of the invention, the group of face models are collected from at least one hundred individuals. FIG. 3 shows the three-dimensional face models. Column 302 shows three-dimensional mesh facial structures. Column 304 shows facial textures and column 306 shows the facial textures applies to the three dimensional mesh facial structures shown in column 302.

Figure 4:
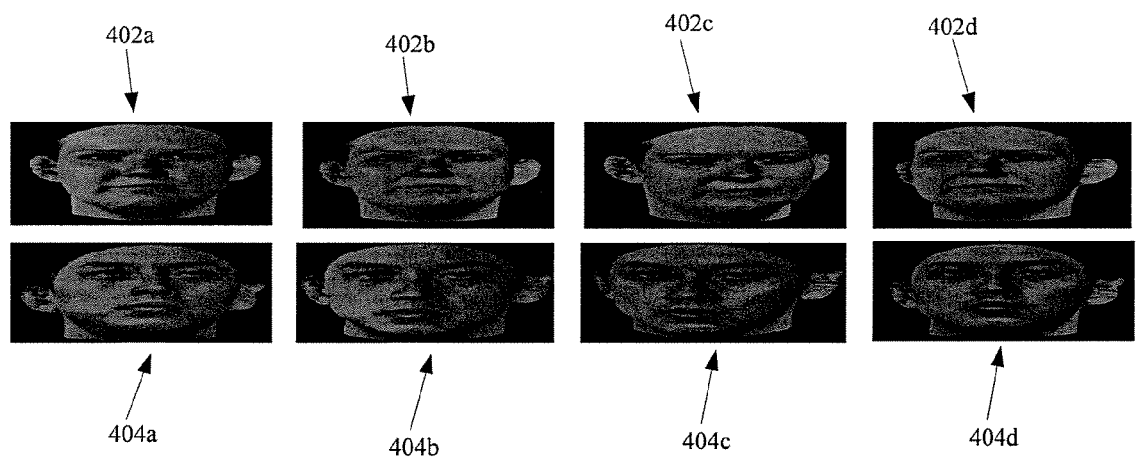
FIG. 4 shows a plurality of virtual facial images that have different poses, illumination and expressions, in accordance with an embodiment of the invention.

In step 204 a plurality of virtual images are created from the three-dimensional face models for each of the faces to create a dataset. The virtual images may represent a variety of different poses, illumination, expressions and conditions that may vary between images. In one embodiment of the invention, at least five hundred virtual images are created for each of the faces. In another embodiment of the invention, at least six hundred virtual images are created for each of the faces. FIG. 4 shows a plurality of virtual facial images that have different poses, illumination and expressions, in accordance with an embodiment of the invention. Virtual images 402a-402d are created from the same three-dimensional face model. And, virtual images 404a-404d are created from a different three-dimensional face model.

Discriminative features are identified by selecting features from the plurality of virtual images such that the identified discriminative features are independent of the dataset in step 206. Selecting features that are independent of the dataset allows for selecting features once using the synthetic face database, and the selected features can be generalized to recognize faces of other face databases. Moreover, training is reduced by eliminating the requirement of computing difference images. Mathematical algorithms are described below for selecting the discriminative features in accordance with various aspects of the invention.

In step 208 weights may be assigned to the identified discriminative features based on classification strengths of the features. Larger weight values may be assigned to features that are stronger classifiers. The weights may be used by algorithms that create a candidate list of matches by comparing features of an unknown facial image to features of images in the dataset. Finally, in step 210 the identified discriminative features of an unknown facial image are analyzed. The unknown facial image may be an image that is not part of the dataset. The discriminative features of the unknown facial image are compared to discriminative features of the virtual images to create a candidate list of matches.

Face recognition boosting algorithms combine the performance of several weak classifiers to produce accurate algorithms. Classifiers are features that are used to identify faces. During training, training samples are re-weighted according to resulting training error and weak classifiers trained later are forced to focus on the harder examples with higher weights. Boosting procedures are formulated as an additive model fitting problem $$F(x) = \sum_{t=1}^{T} f_t(x) \qquad \text{(equation 1)}$$

where $f_t(x)$ is a weak leaner.

For joint boosting face recognition, assume the sample points are given as $\{x_i, y_i\}_{i=1}^{N}$ where $x_i \in R^d$ is a training sample, $y_i \in \{1,2,3,\ldots,C\}$ is a class label, and each individual $c \in \{1,2,\ldots,C\}$ has $n_c$ samples. Instead of directly processing the raw data, we map the input samples into the feature space with projection functions $\phi_j \in \Phi: R^d \rightarrow R$, $j=1, 2, \ldots, M$. An ultimate goal is to select a subset of discriminative features $\{\phi_j(x)\}$ which effectively separate each class from all the others.

Algorithms and procedures that are designed to solve face recognition problems must solve a problem that can be characterized as a multi-class classification problem, where each class contains the images of one individual. The recognition task is actually to discriminate images of one class from images of other classes. Therefore a face recognition problem can be straightforwardly formulated as multiple one-versus-the-rest binary classification problems, which can be formulated as a greedy feature selection process by fitting the following C additive models (c=1, 2, . . . , C)

$$F^c(x) = \sum_{t=1}^{T} f_{j_t^c}^c(x|w_t^c), \quad \text{(equation 2)}$$

where each row represents one boosting model for each person based on an individual one-versus-the-rest training set. One limitation with this formulation is that it may generate an overwhelming number of features given the large number of training persons. In addition, the model may over fit to each individual, thus generalized to other datasets is limited.

As faces have the same facial structure, the selected dominant features for different people may share the same properties. In one embodiment of the invention, in order to capture both the common properties and the individual characteristics using only a manageable small set of features, we propose a new joint boosting method. The method uses an assumption that we can find a set of optimal features which are the same for all individuals, i.e. we assume, $$j_t^1 = j_t^2 = \ldots = j_t^c = j_t \quad \text{(equation 3)}$$

Figure 5:
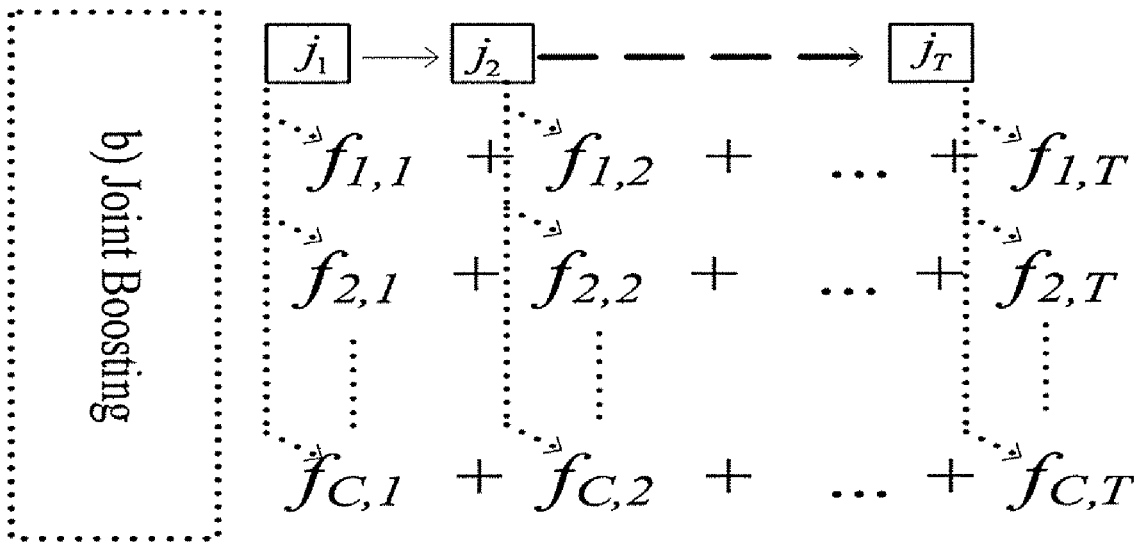
FIG. 5 shows a joint boosting feature selection algorithm for face recognition, in accordance with an embodiment of the invention.

Based on this assumption, we developed a joint boosting feature selection algorithm for face recognition, as shown in FIG. 5.

The selection of features in accordance with an embodiment of the invention is provided below. Suppose $w(x)$ is the weight of a sample x. For any class c, the weighted distribution of positive samples on feature $\phi_j(x)$ is defined as $$h_j^{c,+}(x|w) = p(\phi_j(x)|y=c)^*w(x|y=c)/W_j^{c,+}, \quad \text{(equation 4)}$$

and that of the negative samples is $$h_j^{c,-}(x|w) = p(\phi_j(x)|y \neq c)^*w(x|y \neq c)/W_j^{c,-}, \quad \text{(equation 5)}$$

where $W_j^{c,+}$ and $W_j^{c,-}$ are the normalization factors, and $h_j^{c,+}(x|w)$ and $h_j^{c,-}(x|w)$ are distributions. Here we use w to denote $w(x)$. The weak classifier is defined as $$f_j^c(x|w) = f^c(\phi_j(x)|w) = \frac{1}{2}\log\left(\frac{h_j^{c,+}(x|w)+\varepsilon}{h_j^{c,-}(x|w)+\varepsilon}\right) \quad \text{(equation 6)}$$

where c is the class label, T is the number of features to be selected, $\phi_{j_t^c}$ is the $t^{th}$ feature selected for the $c^{th}$ boosting model, and $w_t^c$ is the assigned weight for the $c^{th}$ boosting model at the $t^{th}$-step.

To evaluate the performance of feature $\phi_j$ in the $c^{th}$ model at the $t^{th}$ step, we define the cost function $G_t^c(j)$ on the weak classifier $f_j^c(x|w_t^c)$ as $$G_t^c(j) = \quad \text{(equation 7)}$$

-continued $$\int_{x \in X} G(f_j^c(x|w_t^c)|y, w_t^c) dx = \int_{x \in X} (h_j^{c,+}(x|w_t^c), h_j^{c,-}(x|w_t^c)) dx$$

where function $g(r(x),s(x))$ is the measure of the classification error of logistic classifier defined on the weighted distributions $r(x)$ and $s(x)$.

Therefore, for each model c, a best feature for the $t^{th}$-step is selected by $$j_t^c = \operatorname{argmin}_j G_t^c(j) \quad \text{(equation 8)}$$

All the feature selection procedures for the C different boosting models $F^c(x)$ can be combined into a joint procedure, which is called joint boosting. A best feature for the $t^{th}$-step of joint model is selected by $$j_t = \operatorname{argmin}_j \sum_{c=1}^{C} G_t^c(j) \quad \text{(equation 9)}$$

Finally, FIG. 6 shows a proposed joint boosting algorithm, in accordance with an embodiment of the invention.

Bayesian error may be used to measure the cost of equation 7. This cost function has low computational cost. For a binary classification problem for the classes $\omega_1$ and $\overline{\omega}_2$, the Bayesian error is defined as:

$$R = p(\text{error}) = \quad \text{(equation 10)}$$

$$\int_{x \in X} p(\text{error}|x) dx = \int_{x \in X} \min[p(x|\omega_1), p(x|\omega_2)] dx$$

Substituting the probability distributions $p(w|\overline{\omega}_1)$ and $p(w|\overline{\omega}_2)$ with weighted distribution defined in equations 3 and 4, we have $$R(f_{t,j}^c(x)) = \int_{x \in X} \min[h_j^{c,+}(x|w_t^c), h_j^{c,-}(x|w_t^c)] dx \quad \text{(equation 11)}$$

Therefore, based on equation 11, Bayesian cost for equation 7 may be defined as $$BE(r, s) = \int_{x \in X} \min[r(x), s(x)] dx \quad \text{(equation 12)}$$

Evaluating equations 6 and 11 directly may not be straightforward. In one embodiment of the invention, K-bins histograms are used to discretize the distribution of the weighted distributions by partitioning the region $[\min(\phi_j(x)), \max(\phi_j(x))]$ into several disjoint bins $X_j^1, X_j^2, \ldots, X_j^K$. We define $$h_{t,j}^{c,+}(k) = \sum_{\phi_j(x_i) \subset X_i^k \wedge y_i = c} w_{t,i}/W_{t,j}^{c,+} \quad \text{(equation 13)}$$

and $$h_{t,j}^{c,-}(k) = \sum_{\phi_j(x_i) \subset X_i^k \wedge y_i \neq c} w_{t,i}/W_{t,j}^{c,-} \quad \text{(equation 14)}$$

where $k \in \{1,2,\ldots,K\}$, $W_{t,j}^{c,+}$ and $W_{t,j}^{c,-}$ are the normalization factors and $h_{t,j}^{c,+}(k)$ and $h_{t,j}^{c,-}(k)$ are the distributions on a discrete set $k \in \{1,2,\ldots,K\}$.

Using equation 13, $h_{t,j}^{c,+}(k)$ becomes a loop-up-table function for $h_j^{c,+}(x|w_t^c)$. Therefore, we have $$h_j^{c,+}(x \mid w_t^c) \approx h_{t,j}^{c,+}(k), \quad \text{(equation 15)}$$

where $\phi_j(x) \in X^k$, and when $K \to \infty$, $$h_j^{c,-}(x|w_t^c) \approx h_{t,j}^{c,-}(k) \quad \text{(equation 16)}$$

Therefore, $h_{t,j}^{c,+}(k)$ can be regarded as the discrete version of distribution $h_j^{c,+}(x|w_t^c)$, and similarly $h_{t,j}^{c,-}(k)$ becomes the discrete version of distribution $h_j^{c,-}(x|w_t^c)$.

Substituting equations 13 and 14 for equation 6, the LUT weak classifier can be defined as:

$$f_{t,j}^c(k) = \frac{1}{2} \log\left(\frac{h_{t,j}^{c,+}(k) + \varepsilon}{h_{t,j}^{c,-}(k) + \varepsilon}\right) \quad \text{(equation 17)}$$

$$= \frac{1}{2} \log\left(\frac{\sum_{\phi_j(x_i) \subset X_i^k \wedge y_i = c} w_{t,i}/W_{t,j}^+ + \varepsilon}{\sum_{\phi_j(x_i) \subset X_i^k \wedge y_i \neq c} w_{t,i}/W_{t,j}^- + \varepsilon}\right)$$

A discrete version of equation 11 may be defined as:

$$R(f_{t,j}^c(k)) = D_{BE}(h_{t,j}^{c,+}(k), h_{t,j}^{c,-}(k)) = \sum_{k=1}^{K} \min(h_{t,j}^{c,+}(k), h_{t,j}^{c,-}(k)) \quad \text{(equation 18)}$$

Similarly, based on a JSBoost algorithm that is proposed based on symmetric Jensen-Shannon divergence (SJS), which is defined as follows:

$$SJS(r,s) = \int \left[r(x)\log\frac{2r(x)}{r(x)+s(x)} + s(x)\log\frac{2s(x)}{r(x)+s(x)}\right] dx, \quad \text{(equation 19)}$$

where $r(x)$ and $s(x)$ are two distribution functions, a discrete version of symmetric Jensen-Shannon divergence for weak classifier $f_{t,j}^c(x)$ is as follows:

$$SJS(f_{t,j}^c(k)) = D_{sjs}(h_{t,j}^{c,+}(k), h_{t,j}^{c,-}(k)) \quad \text{(equation 20)}$$

-continued $$= \sum_{k=1}^{K} \left\{ h_{t,j}^{c,+}(k)\frac{2h_{t,j}^{c,+}(k)}{h_{t,j}^{c,+}(k)+h_{t,j}^{c,-}(k)} + h_{t,j}^{c,-}(k)\frac{2h_{t,j}^{c,-}(k)}{h_{t,j}^{c,+}(k)+h_{t,j}^{c,-}(k)} \right\}$$

Aspects of the invention may be used with a variety of software and hardware applications that use facial recognition. Exemplary applications include security applications, archiving photographs, access control and identification applications.

The present invention has been described in terms of exemplary embodiments. Numerous other embodiments, modifications and variations within the scope and spirit of the appended claims will occur to persons of ordinary skill in the art from a review of this disclosure.

We claim:

1. A computer-implemented method of verifying the identity of individuals including selecting facial features used to recognize faces with a face recognition module operating on a processor, the method comprising:
   collecting three-dimensional face models using a computer input scanning device and storing the three-dimensional face models in a hardware memory storage device;
   using the face recognition module to perform the following:
      create a plurality of electronic virtual images from the three-dimensional face models for each of the faces to create a dataset, the dataset comprising the electronic virtual images being stored in a hardware memory storage device, wherein the processor is operative on the hardware memory storage device;
      identify discriminative features by selecting features from the plurality of electronic virtual images such that the identified discriminative features are independent of the dataset, wherein identifying comprises evaluating a performance of features by evaluating:

$$G_t^c(j) = \int_{x \in X} g(h_j^{c,+}(x|w_t^c), h_j^{c,-}(x|w_t^c)) dx.$$

wherein $h^{c,j^+}(x|w)$ and $h^{c,j^-}(x|w)$ are weighted distributions,
c represents a model class,
t represents a training sample number,
j represents a feature being evaluated,
$w_t^c$ represents a weight of a $c^{th}$ boosting model, at a $t^{th}$ step,
and function $g(r(x),s(x))$ is a measure of classification error of a logistic classifier defined on weighted distributions $r(x)$ and $s(x)$,
assign weights to the identified discriminative features based on classification strengths of the features, wherein the discriminative features that have strong classification strengths are assigned large weights,
boost discriminative features having weak classification strengths by assigning a large weight to a combination of discriminative features having weak classification strengths,
receive an unidentified facial image from an input device,
analyze the discriminative features of the unidentified facial image, and verify the identity of an individual associated with the unidentified facial image using the discriminative features identified; and providing an indication to the user of the verification, wherein the indication includes a candidate list of matches.

2. The method of claim 1, wherein creating comprises creating at least 500 virtual images for each of the faces.

3. The method of claim 1, wherein creating comprises creating at least 600 virtual images for each of the faces.

4. The method of claim 1, wherein the three-dimensional face models are collected from at least 100 individuals.

5. The method of claim 1, wherein the three-dimensional face models are collected from a three-dimensional laser-scanner.

6. The method of claim 1, wherein identifying further comprises determining Bayesian error by evaluating:

$$R(f_{t,j}^c(x)) = \int_{x \in X} \min[h_j^{c,+}(x|w_t^c), h_j^{c,-}(x|w_t^c)] dx.$$

7. The method of claim 1, wherein identifying comprises evaluating a greedy feature selection process.

8. The method of claim 1, wherein identifying comprises evaluating a joint boosting algorithm.

9. The method of claim 1, wherein at least some of the virtual images comprises images showing different poses.

10. The method of claim 1, wherein at least some of the virtual images comprises images having different illumination.

11. The method of claim 1, wherein at least some of the virtual images comprises images having different facial expressions.

12. The method of claim 1, wherein identifying comprises identifying weak classifiers by analyzing a multiple bin histogram showing numbers of virtual images that have values for a set of features.

13. The method of claim 12, wherein identifying further includes selecting several weak classifiers.

14. A computer-implemented method of recognizing facial images with a face recognition module operating on a processor, the method comprising:

creating three-dimensional face models for a group of faces using a computer input scanning device;

creating a plurality of virtual images from the three-dimensional face models for each of the faces to create a dataset, the dataset comprising the virtual images being stored in a hardware memory storage device, wherein the processor is operative on the hardware memory storage device;

identifying discriminative features by selecting features from the plurality of virtual images such that the identified discriminative features are independent of the dataset, wherein identifying comprises evaluating a performance of features by evaluating:

$$G_t^c(j) = \int_{x \in X} g(h_j^{c,+}(x|w_t^c), h_j^{c,-}(x|w_t^c)) dx$$

wherein $h_j^{c,+}(x|w)$ and $h_j^{c,-}(x|w)$ are weighted distributions, c represents a model class, t represents a training sample number, j represents a feature being evaluated, $w_t^c$ represents a weight of a $c^{th}$ boosting model, at a $t^{th}$ step, and function $g(r(x),s(x))$ is a measure of classification error of a logistic classifier defined on weighted distributions $r(x)$ and $s(x)$;

generalizing the selected features to recognize faces from other databases;

analyzing the identified discriminative features of an unknown facial image, wherein the unknown facial image is not part of the dataset;

determining the identity of an individual associated with the unknown facial image using the discriminative features identified; and providing an indication to a user of the determination, wherein the indication includes a candidate list of matches.

15. The method of claim 14, wherein analyzing comprises comparing features of the unknown facial image to features of images in the dataset to create a candidate list of matches.

16. The method of claim 14, wherein at least some of the virtual images comprises images showing different poses.

17. At least one computer-readable storage medium containing computer-executable instructions for causing a computer device including a processor to select facial features used to recognize faces by performing the steps comprising:

(a) creating three-dimensional face models for a group of faces using a computer input scanning device;

(b) creating a plurality of virtual images from the three-dimensional face models for each of the faces to create a dataset, the dataset comprising the virtual images being stored in a computer-readable storage device, wherein the processor is operative on the computer-readable storage device;

(c) identifying discriminative features by selecting features from the plurality of virtual images such that the identified discriminative features are independent of the dataset, wherein identifying comprises evaluating a performance of features by evaluating:

$$G_t^c(j) = \int_{x \in X} g(h_j^{c,+}(x|w_t^c), h_j^{c,-}(x|w_t^c)) dx$$

wherein $h_j^{c,+}(x|w)$ and $h_j^{c,-}(x|w)$ are weighted distributions, c represents a model class, t represents a training sample number, j represents a feature being evaluated, $w_t^c$ represents a weight of a $c^{th}$ boosting model, at a $t^{th}$ step, and function $g(r(x),s(x))$ is a measure of classification error of a logistic classifier defined on weighted distributions $r(x)$ and $s(x)$; and (d) verifying verifying the identity of an individual associated with an unknown facial image using the discriminative features identified, wherein the unknown facial image is not part of the dataset.

* * * * *